(12) United States Patent
Jordan et al.

(10) Patent No.: US 8,757,594 B2
(45) Date of Patent: Jun. 24, 2014

(54) PULLING JACKET FOR USE WHILE INSTALLING WIRES IN CONDUIT

(75) Inventors: David Jordan, Knoxville, TN (US); Michael Jordan, Knoxville, TN (US)

(73) Assignee: Southwire Company, LLC, Carrollton, GA (US)

( * ) Notice: Subject to any disclaimer, the term of this patent is extended or adjusted under 35 U.S.C. 154(b) by 734 days.

(21) Appl. No.: 12/603,222

(22) Filed: Oct. 21, 2009

(65) Prior Publication Data

US 2010/0102286 A1 Apr. 29, 2010

Related U.S. Application Data

(60) Provisional application No. 61/107,881, filed on Oct. 23, 2008.

(51) Int. Cl.
*H02G 3/04* (2006.01)
*H02G 3/22* (2006.01)
*H02G 3/38* (2006.01)
*H02G 1/00* (2006.01)

(52) U.S. Cl.
USPC ......... 254/134.3 FT; 254/134; 254/134.3 PA; 294/86.4; 294/86.42

(58) Field of Classification Search
USPC .................... 254/134.3 PA, 134.3 FT, 134; 294/86.42, 74, 86.11, 86.4
See application file for complete search history.

(56) References Cited

U.S. PATENT DOCUMENTS

| 321,130 | A | | 6/1885 | Moore |
|---|---|---|---|---|
| 524,035 | A | | 8/1894 | White |
| 564,012 | A | | 7/1896 | Fraser |
| 690,438 | A | | 1/1902 | Jones |
| 707,732 | A | | 8/1902 | Swarm |
| 749,760 | A | | 1/1904 | Townsend |
| 842,329 | A | | 1/1907 | McClean |
| 1,039,727 | A | | 10/1912 | Gilmartin |
| 1,114,637 | A | * | 10/1914 | Nolan ........................... 403/373 |
| 1,265,141 | A | | 5/1918 | Trippe |
| 1,272,392 | A | | 7/1918 | Craven et al |
| 1,504,087 | A | | 8/1924 | Brady |
| 1,520,716 | A | | 12/1924 | Judd |
| 1,634,422 | A | | 7/1927 | Holmes |
| 1,670,543 | A | * | 5/1928 | Kellems ........................ 403/291 |
| 1,720,037 | A | | 7/1929 | Entwistle et al. |
| 1,732,410 | A | * | 10/1929 | Martin ........................... 403/210 |
| 1,760,885 | A | | 6/1930 | Prelesnik |

(Continued)

OTHER PUBLICATIONS

International Search Report and Written Opinion dated Nov. 17, 2009 in International Application No. PCT/US2009/036224.

(Continued)

*Primary Examiner* — Phi A

(74) *Attorney, Agent, or Firm* — Hartman & Citrin LLC

(57) ABSTRACT

A system for installing wire and the like in a conduit which includes a plurality of wire pulling grips and a pulling jacket is provided. The wire pulling jacket encloses the wire pulling grips and keeps them bundled together, making it easier for an operator to use the same. The wire pulling jacket protects the pulling grips by preventing the grips from catching on the conduit, and also keeps the pulling grips clean. The pulling jacket also increases operator safety by reducing the risk that the operator gets a finger, glove, or other part of the body caught in the wire puling grips as these are pulled into the conduit.

19 Claims, 5 Drawing Sheets

(56) References Cited

U.S. PATENT DOCUMENTS

| | | | | |
|---|---|---|---|---|
| 1,802,657 | A | * | 4/1931 | Kellems .................... 24/115 R |
| 1,807,993 | A | * | 6/1931 | Martin ..................... 294/86.42 |
| 2,017,625 | A | * | 10/1935 | Kellems .................... 294/86.42 |
| 2,112,281 | A | * | 3/1938 | Ferris .......................... 403/373 |
| 2,146,575 | A | | 2/1939 | Hefftner |
| 2,231,919 | A | | 2/1941 | Kent |
| 2,322,464 | A | | 6/1943 | McKee et al |
| 2,766,501 | A | | 5/1951 | Kellems |
| 2,585,054 | A | * | 2/1952 | Stachura ...................... 174/36 |
| 2,614,801 | A | | 10/1952 | Mazzei |
| 2,697,872 | A | | 12/1954 | Armstrong |
| 2,736,532 | A | | 2/1956 | Hughes |
| 2,853,335 | A | | 9/1958 | Mogle |
| 2,935,299 | A | | 5/1960 | Jansen |
| 2,950,525 | A | | 8/1960 | Duncan et al. |
| 3,038,754 | A | | 6/1962 | Petersen |
| 3,122,806 | A | * | 3/1964 | Lewis ......................... 403/220 |
| 3,133,725 | A | * | 5/1964 | Lanum ................... 254/134.3 R |
| 3,137,765 | A | * | 6/1964 | Lanum ......................... 174/90 |
| 3,252,210 | A | | 5/1966 | Bowden |
| 3,312,128 | A | | 4/1967 | Wasson |
| 3,492,032 | A | | 1/1970 | Deike |
| 3,659,890 | A | | 5/1972 | Renfroe |
| 3,672,006 | A | * | 6/1972 | Fidrych ....................... 24/122.6 |
| 3,709,546 | A | | 1/1973 | Vaughan |
| 3,727,967 | A | | 4/1973 | Anastasiu et al. |
| 3,730,129 | A | | 5/1973 | Helms |
| 3,776,586 | A | | 12/1973 | Ahlgren et al. |
| 3,906,619 | A | | 9/1975 | Shaffer |
| 4,015,873 | A | | 4/1977 | Langguth |
| 4,019,715 | A | | 4/1977 | Vugrek |
| 4,077,094 | A | | 3/1978 | Swager |
| 4,214,362 | A | | 7/1980 | Beard |
| 4,225,172 | A | * | 9/1980 | Marquardt ....................... 294/74 |
| 4,312,124 | A | | 1/1982 | Calhoun |
| 4,354,705 | A | * | 10/1982 | Shorey et al. .............. 294/86.42 |
| 4,368,910 | A | * | 1/1983 | Fidrych ..................... 294/86.42 |
| 4,377,956 | A | | 3/1983 | Cooper |
| 4,453,291 | A | | 6/1984 | Fidrych |
| 4,514,005 | A | * | 4/1985 | Fallon ........................ 294/86.42 |
| 4,575,032 | A | | 3/1986 | Taylor |
| 4,601,507 | A | * | 7/1986 | Fallon ........................ 294/86.42 |
| 4,659,126 | A | | 4/1987 | Breck et al. |
| 4,736,971 | A | | 4/1988 | McManus |
| 4,736,978 | A | | 4/1988 | Cielker |
| 4,746,099 | A | | 5/1988 | Lopes |
| 4,843,687 | A | | 7/1989 | Kroepelin, Jr. |
| 5,015,023 | A | | 5/1991 | Hall |
| 5,015,805 | A | * | 5/1991 | Beckloff et al. ............ 174/75 C |
| 5,022,633 | A | | 6/1991 | Lopes |
| 5,038,663 | A | * | 8/1991 | Plummer ........................... 87/6 |
| 5,127,853 | A | | 7/1992 | McMills et al. |
| 5,133,583 | A | * | 7/1992 | Wagman et al. ........... 294/86.42 |
| 5,199,146 | A | | 4/1993 | Grover et al. |
| 5,245,730 | A | | 9/1993 | Martin |
| 5,283,930 | A | | 2/1994 | Krauss |
| 5,480,203 | A | * | 1/1996 | Favalora et al. ........... 294/86.42 |
| 5,513,555 | A | | 5/1996 | Plank et al. |
| 5,548,873 | A | | 8/1996 | Macias |
| 5,868,060 | A | | 2/1999 | Plank et al. |
| 5,984,273 | A | | 11/1999 | Ray |
| 5,988,719 | A | | 11/1999 | Lavender |
| 6,050,587 | A | * | 4/2000 | Panhausen .................... 280/480 |
| 6,178,604 | B1 | | 1/2001 | Pennoyer, Jr. |
| 6,286,815 | B1 | | 9/2001 | Ray |
| 6,416,040 | B1 | | 7/2002 | Bergman |
| 6,446,531 | B1 | | 9/2002 | Colombani |
| 6,471,268 | B1 | | 10/2002 | Stenstrom et al. |
| 6,682,050 | B1 | | 1/2004 | Ray |
| 6,695,290 | B1 | | 2/2004 | O'Connell |
| 6,883,782 | B2 | | 4/2005 | Ames et al. |
| 6,974,169 | B1 | | 12/2005 | Upton |
| 7,128,306 | B2 | | 10/2006 | Ames et al. |
| 7,146,697 | B2 | | 12/2006 | Chan et al. |
| 7,246,789 | B2 | | 7/2007 | Ames et al. |
| 7,478,794 | B1 | | 1/2009 | Gohlke et al. |
| 8,016,267 | B2 | | 9/2011 | Jordan et al. |
| 8,025,261 | B2 | | 9/2011 | Jordan et al. |
| 8,091,866 | B2 | * | 1/2012 | White .................. 254/134.3 FT |
| 8,292,267 | B2 | | 10/2012 | Jordan et al. |
| 8,459,612 | B2 | | 6/2013 | Jordan et al. |
| 2001/0019122 | A1 | * | 9/2001 | Mayr et al. ........... 254/134.3 FT |
| 2004/0007700 | A1 | * | 1/2004 | Hazel .................. 254/134.3 FT |
| 2005/0184280 | A1 | * | 8/2005 | Rivers et al. ......... 254/134.3 FT |
| 2005/0194578 | A1 | * | 9/2005 | Morris ................. 254/134.3 FT |

OTHER PUBLICATIONS

U.S. Office Action dated Feb. 16, 2012 in U.S. Appl. No. 12/398,840.
U.S. Notice of Allowance dated Jun. 7, 2012 in U.S. Appl. No. 12/398,840.
U.S. Office Action dated Oct. 16, 2012 in U.S. Appl. No. 13/608,057.
U.S. Notice of Allowance dated Jan. 31, 2013 in U.S. Appl. No. 13/608,057.
U.S. Notice of Allowance dated Mar. 28, 2013 in U.S. Appl. No. 13/608,057.

* cited by examiner

PULLING JACKET FOR USE WHILE INSTALLING WIRES IN CONDUIT

PRIORITY

The present application claims the benefit of U.S. Provisional Application Ser. No. 61/107,881, filed Oct. 23, 2008, which is herein incorporated by reference in its entirety.

THE FIELD OF THE INVENTION

The present invention relates to installing electrical wires and the like in conduit. More specifically, the present invention relates to a protective sleeve for use with wire pulling grips to install wires in conduit or other similar enclosures.

BACKGROUND

Wires, cables, and the like are commonly installed by pulling the same through a pre-installed conduit. Herein, the term wire is used to describe the various types of wires, cables, fiber optic cables, and the like which are used. Construction of industrial or commercial buildings commonly involves placing conduits in the walls, floors, or ceilings of the building and installing wires or cables in the conduit after construction of that portion of the building has been completed. Similarly, municipal wires and cables are often pulled through underground conduits in order to install the cables.

When installing wires, a rope or other pulling line is first threaded through the conduit. One end of the pulling line is then connected to the wire, typically via a pulling grip, and a pulling machine is attached to the other end of the pulling line and used to pull the wire through the conduit via the pulling line. The pulling machine will typically exert a force on the order of thousands of pounds in order to pull the wire through the conduit. Lengthy conduits, bends in the conduit and the stiffness of the wire itself all contribute to the high pulling force required to pull wires through a conduit.

It is highly desirable to pull a wire through a conduit without loss of connection to the wire, damage to the wire or pulling grips, or other incident. If damage or lost connection to the wire occurs while installing the wire, the wire must typically be removed from the conduit. The wire is typically not usable again, resulting in lost time and lost materials. In many instances, multiple wires are installed simultaneously in a conduit. This may be the case where main power lines are being installed, where multiple communications lines are being installed, etc. In such a situation, a lost connection or damage to a single wire will require removal of all of the wires.

It will thus be appreciated that it is desirable to improve the reliability of the wire pulling grips and associated devices so as to reduce or eliminate the possibility that connection to the wire is lost or that the wire is damaged.

While installing wire, it is often necessary to guide the wire pulling grips and equipment and the wire into the conduit. Where multiple wires are being installed simultaneously, it may be difficult for an operator to guide the grips and wire into the conduit. In such a situation it would be convenient to have a device which bundles the wires and pulling grips together to make it easier to feed these into the conduit.

The pulling grips and associated equipment are periodically damaged while installing wire. In some cases, the grips are damaged when a shoulder or fastener which is part of the grip gets caught on the conduit while feeding the grip into the conduit. In other cases, the pulling grips may be damaged as they slide along the inside of the conduit. If the grips are damaged they must be replaced, resulting in additional costs. Perhaps more importantly, however, significant time may be lost in replacing the grips. It is thus desirable to reduce the risk that the wire pulling grips and associated equipment is damaged while installing the wire.

Additionally, it is desirable to keep the wire pulling grips clean while they are being used. The conduit is often somewhat dirty on the inside. The conduit may contain cement and other debris from construction, metal pieces from manufacturing, etc. Additionally, lubricant is often used while installing wires to reduce the damage to the wire and to reduce the force necessary to pull the wire through the conduit. The debris and lubricant typically coats the wire pulling grips while these are used. The lubricant and debris make the grips more difficult to use, get the operator dirty, and may reduce the effectiveness of the grips in gripping the wire. It is thus often necessary to clean the wire grips. The wire pulling grips may thus be cleaned between pulls as well as after the days use. Pulling grips often include a twisted or braided cable with an eyelet and a cylindrical grip body attached thereto, and thus requires some time to clean. A significant amount of time may thus be spent cleaning wire pulling grips during a day.

It is further desirable to reduce the risk of injury while installing wires into conduit. Wire pulling grips typically have a number of places such as the eyelet or the grip body where an operator's finger, glove, etc. may get caught. This may occur as the operator is guiding a plurality of wire pulling grips into a conduit at the beginning of a wire pull. As the wire pulling machine is located at the other end of the conduit and operated by another person, the wire pulling machine may not be stopped in time should the operator become entangled in the wire pulling grip. Because a significant amount of force is used to pull the wires through the conduit, the operator may well lose or seriously damage a hand or finger if it becomes caught in the wire pulling grip. It is thus desirable to enclose the wire pulling grips during use to reduce the risk of injury.

SUMMARY OF THE INVENTION

It is an object of the present invention to provide a jacket for use with wire pulling grips while installing wire into conduit.

According to one aspect of the invention, a jacket and a plurality of wire pulling grips are provided where the pulling jacket is wrapped around the wire pulling grips while the grips are used to install wire in conduit. The jacket serves to protect the grips from damage and from becoming dirty while traveling through the conduit. The jacket also makes it easier to use the wire pulling grips and protects the user from injury while using the wire pulling grips.

These and other aspects of the present invention are realized in a pulling jacket for wire pulling grips as is shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
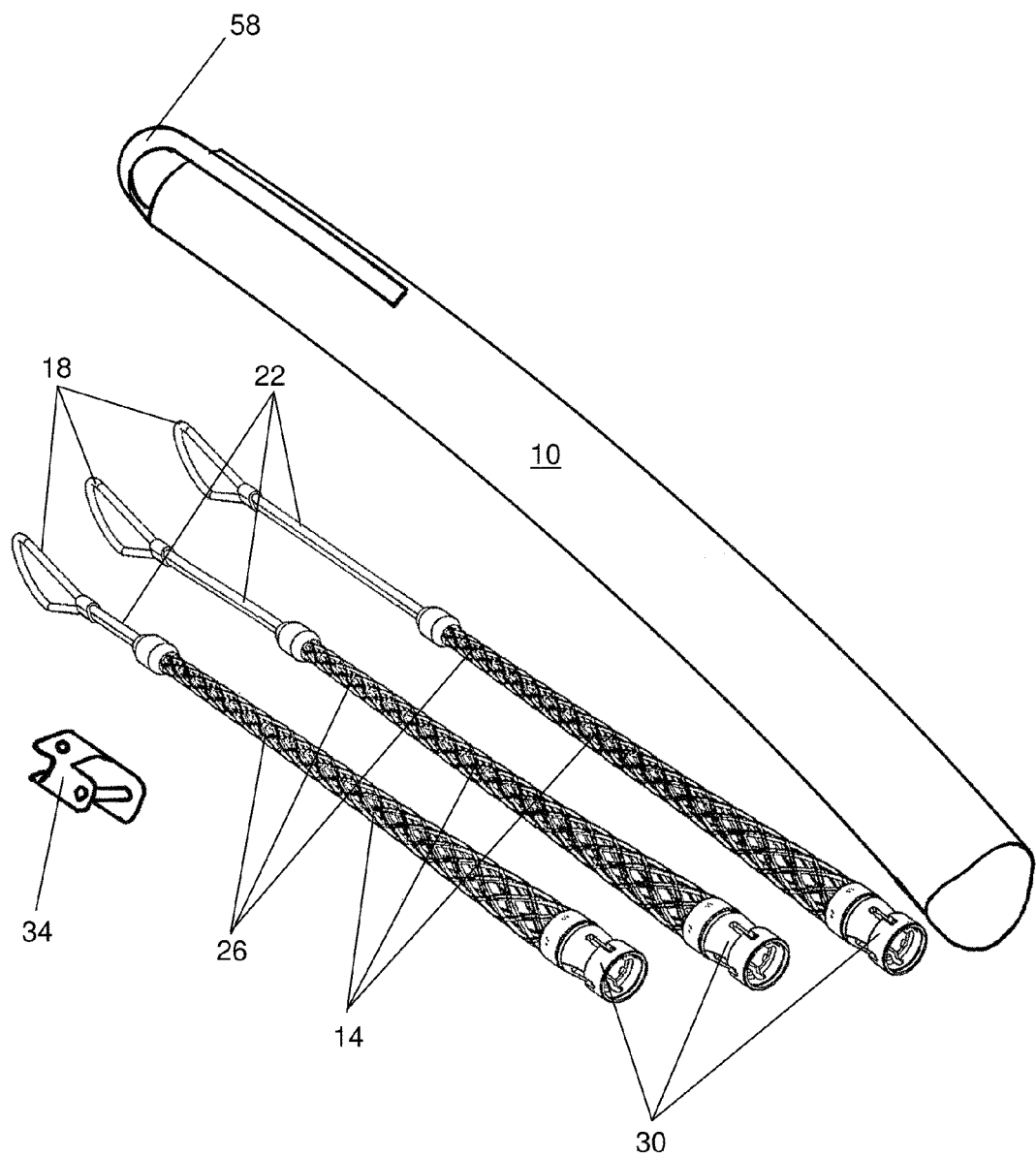
FIG. 1 shows a perspective view of a pulling jacket and wire pulling grips according to the present invention.

Turning now to FIG. 1, a perspective view of a pulling jacket 10 and a plurality of wire pulling grips 14 are shown. Each of the wire pulling grips 14 includes an eyelet 18, a length of wire cable 22, a braided cable sleeve 26, often known as a kellum grip, and a cylindrical wire clamping body 30. The pulling grips 14 shown are exemplary, and other styles of wire pulling grips may be used with the pulling jacket 10. Typically, however, the pulling grips 14 will include an eyelet 18 or other opening used to attach the puling grip to a wire pulling rope and a pulling body used to grip and pull a wire.

In use, a wire is passed through the wire clamping body 30 and into the braided cable sleeve 26. The clamping body 30 has toothed or textured cams which extend inwardly into the bore of the clamping body and grip the wire when the wire is passed therethrough and prevent the wire from pulling back out of the clamping body until the cams are released. The cams are typically biased towards the center of the clamping body 30 so that they are maintained in contact with a wire placed through the clamping body. The clamping body 30 places the braided sleeve 26 under tension while pulling the wire and the braided sleeve 26 contracts around the wire under tension and grips the wire, applying the majority of the pulling force to the wire. The eyelet 18 is connected to the pulling rope, typically by a clevis 34.

In use, multiple wire pulling grips 14 are often used simultaneously to pull the desired number of wires through a conduit. Typically, all of the wires which are to be installed into a conduit are pulled simultaneously through the conduit. Thus a person may often be using a number of wire pulling grips 14 at the same time to install wire into a conduit. The grips may be different overall lengths so that the clamping bodies 30 are placed at different lengths from the clevis 34 and do not all reside in the same place in the conduit while traveling therethrough.

When a person is pulling multiple wires through a conduit, they experience increased difficulty in keeping the wires and pulling grips 14 neatly bundled and started through the conduit. If one of the wire pulling grips 14 becomes caught on the conduit, the grip may be damaged, resulting in a loss of time and materials. If the person's glove or hand becomes caught in the pulling grip or wire, the glove or hand may also be damaged and result in a failed wire installation. The installation of wire in a conduit typically involves two people. One person handles the wire pulling grips and helps to feed the wire into the conduit while another person operates a wire pulling machine in another location to pull the wire through the conduit. If a problem arises with the person handling the wire pulling grips, the person operating the wire pulling machine may not appreciate the problem before damage occurs.

The pulling jacket 10 is used with the wire pulling grips 14 to avoid damage to the wire pulling grips. The pulling jacket 10 is placed around the wire pulling grips 14 and holds the grips 14 together in a bundle, protecting both the grips and the operator and making it easier for the operator to feed the grips through a conduit. When using the pulling jacket 10, the person feeding the grips into a conduit easily feeds a single bundle of grips into the conduit opening rather than trying to both keep the grips bundled together and feed them into the conduit. Additionally, the pulling jacket 10 covers any edges or corners on the pulling grips 14, reducing the likelihood that these corners or edges become caught on the conduit. The pulling jacket 10 is typically formed from a heavy duty material such as woven nylon, and is split along the length thereof to allow for easy placement around the wire pulling grips. A fastener such as snaps or a hook and loop fastener is used to hold the pulling jacket closed around the wire pulling grips 14.

Figure 2:
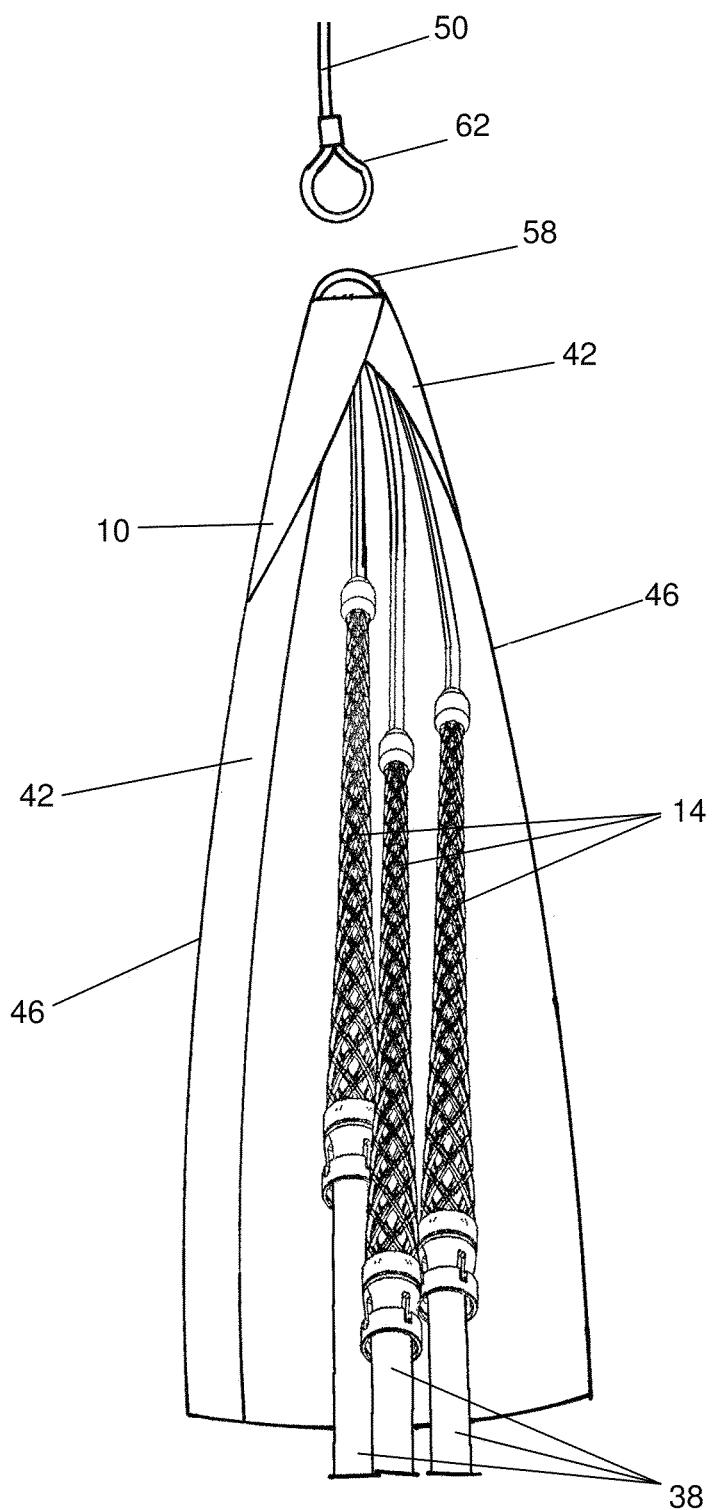
FIG. 2 shows another perspective view of the pulling jacket and wire pulling grips of FIG. 1.

Turning now to FIG. 2, a perspective view of the pulling grips 14 and pulling jacket 10 is shown. Wires 38 have been inserted into each of the pulling grips 14 by passing the wire through the clamping bodies 30 and braided sleeves 26. The pulling jacket 10 has been opened, showing two strips 42 of mating hook and loop fastener material which extends along the length of the lateral edges 46 of the jacket. The hook and loop fastening material 42 allows the pulling jacket 10 to be easily opened and closed to prepare the same for use.

Figure 3:
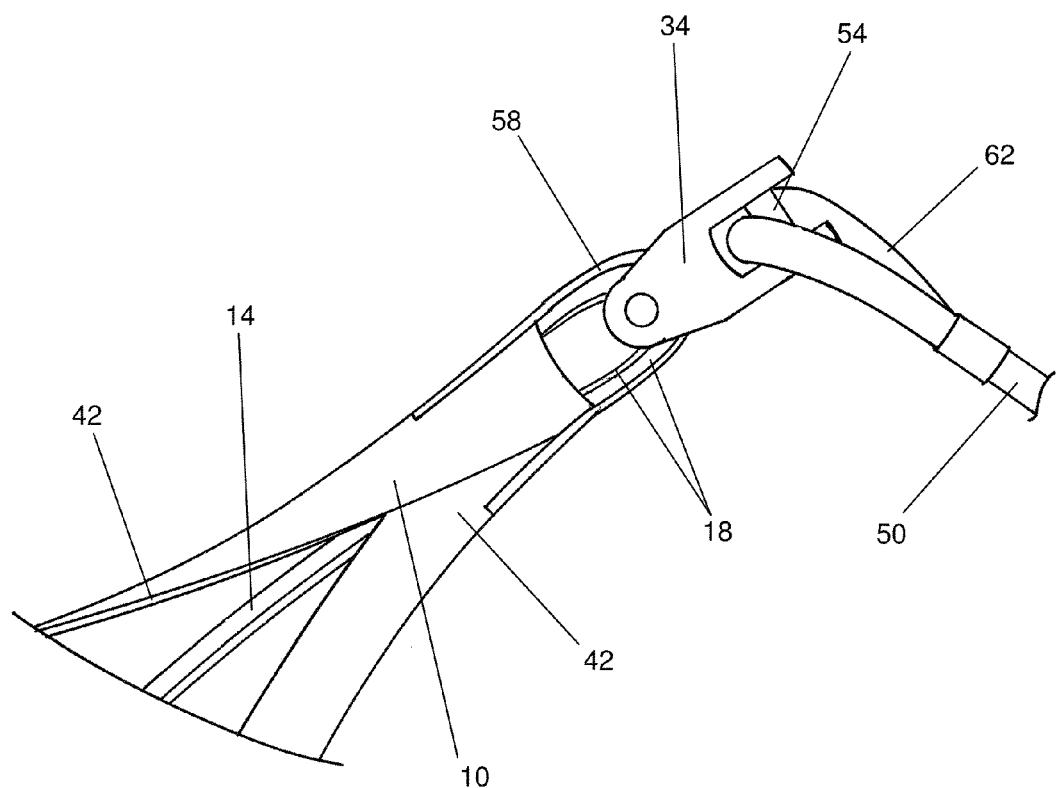
FIG. 3 shows another perspective view of the pulling jacket and wire pulling grips of FIG. 1.

FIG. 3 shows a close up view of the front end of the pulling jacket 10 and pulling grips 14. A clevis 34 is used to connect the pulling grips 14 and pulling jacket 10 to a pulling rope 50. The clevis 34 has removable pins 54 which are used to connect the pulling grip eyelets 18 and a pulling jacket eyelet 58 as well as a pulling rope eyelet 62 to the clevis. In use, the pulling grips 14 are positioned in the pulling jacket 10 such that the pulling grip eyelets 18 are positioned adjacent the pulling jacket eyelet 58 as shown. A pin 54 is removed from the clevis 34 and the open end of the clevis 34 is placed around the pulling jacket eyelet 58 and pulling grip eyelets 18. The pin 54 is then inserted into the clevis 34 to capture the eyelets 18, 58. The other end of the clevis 34 is similarly attached to the pulling rope eyelet 62.

Figure 4:
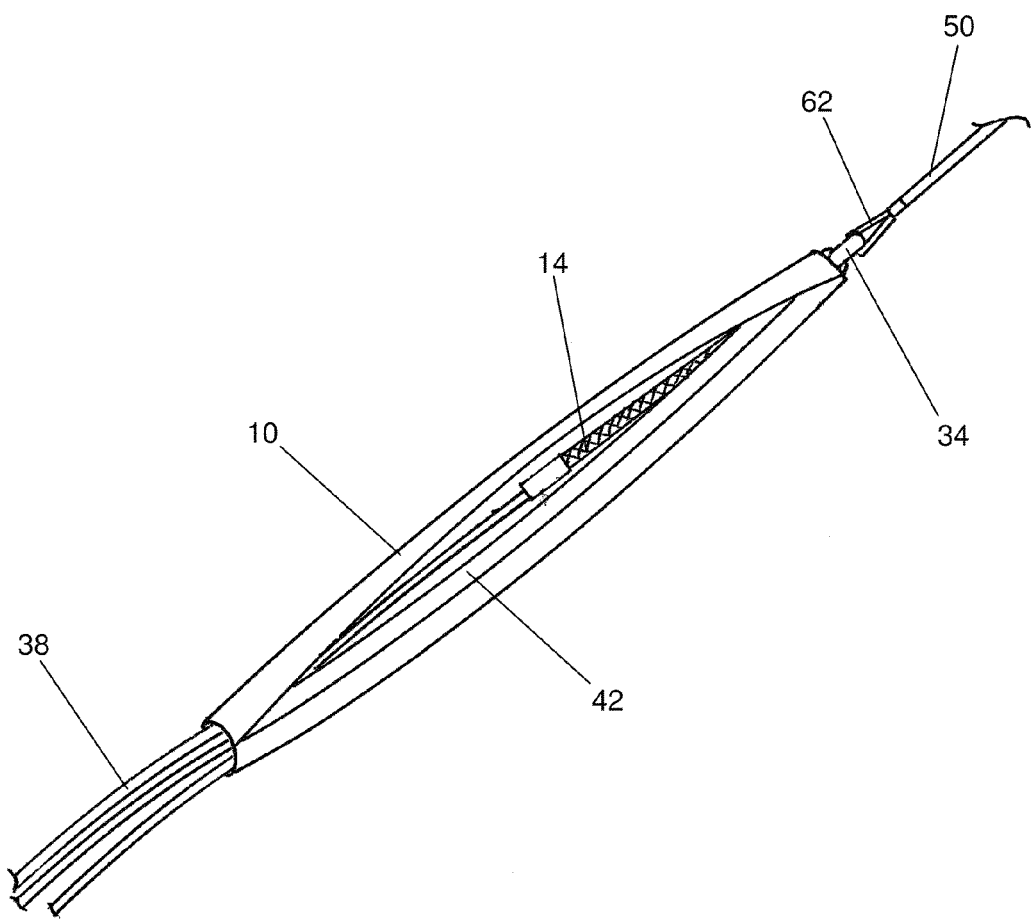
FIG. 4 shows another perspective view of the pulling jacket and wire pulling grips of FIG. 1.
Figure 5:
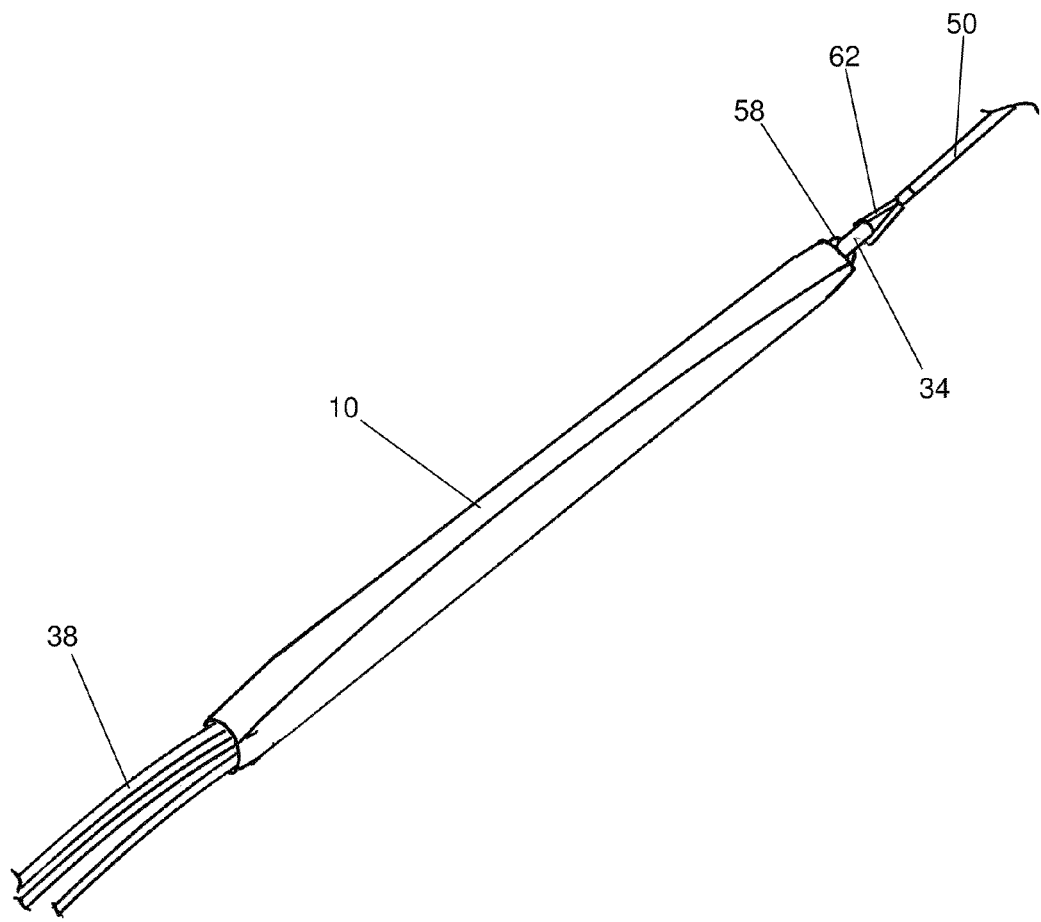
FIG. 5 shows another perspective view of the pulling jacket and wire pulling grips of FIG. 1.

FIG. 4 shows another perspective view of the pulling jacket 10 and pulling grips 14. The pulling jacket 10 has been partially closed around the puling grips 14 and a portion of the wires 38. An operator closes the pulling jacket 10 as shown and uses the hook and loop fastener 42 to hold the pulling jacket closed. FIG. 5 shows the pulling jacket 10 in a closed position around the pulling grips 14 and wires 38. It can be observed how the pulling jacket 10 holds the pulling grips 14 in a tightly bundled orientation.

The pulling jacket 10 keeps the pulling grips 14 and wires 38 in a tight bundle with a roughly circular cross section and covers any exposed shoulders such as on the clamping bodies 30 or other locations along the grips which may bind on the conduit. This helps an operator manage the pulling grips 14 at the beginning of the pull, making it significantly easier to get the pulling grips 14 properly inserted into a conduit. Without the pulling jacket 10, the operator would often hold the pulling grips 14 and wire 38 together with his hands resulting in risk that the pulling grips are not fed properly into the conduit. There is also some risk that the operator gets a finger, glove, or hand caught in the pulling grips. The pulling jacket 10 thus reduces the risk that the pulling grips 14 are damaged or that injury occurs during the wire pulling operation.

It can also be seen how, by enclosing the pulling grips 14, the pulling jacket 10 will largely prevent the grips from being dirtied by the debris and lubricant which is typically present in the conduit. This allows the operator to continuously use the pulling grips without stopping to clean the grips between pulls. The pulling jacket 10 will also protect the pulling grips from wear as they are pulled through a conduit. The pulling jacket 10 may be relatively inexpensive so that an operator may have several jackets for a set of pulling grips and may use multiple pulling jackets during a day and wash all of the jackets after finishing.

There is thus disclosed an improved pulling jacket for use with wire pulling grips. It will be appreciated that numerous changes may be made to the present invention without departing from the scope of the claims.

What is claimed is:

1. A system for installing a plurality of wires into a conduit, the system comprising:
   a plurality of wire pulling grips, each of the plurality of wire pulling grips comprising:
      an eyelet located at a first end of each of the plurality of wire pulling grips, and
      a clamp body located at a second end of each of the plurality of wire pulling grips, the clamp body comprising a textured cam extending inwardly into a bore of the clamp body, the textured cam being biased towards a center of the clamp body, and
      an elongate gripping body connecting the eyelet and the clamp body; and
   a wire pulling jacket, the wire pulling jacket comprising:
      an elongate flexible tubular body extending a length, the elongate flexible tubular body comprising:
         a first end being generally open and a second end being open,
         a lengthwise opening extending the length of the elongate flexible tubular body, the lengthwise opening selectively openable along the length thereof for placement around the plurality of wire pulling grips, the lengthwise opening comprising a first lateral edge extending the length of the elongate flexible tubular body and a second lateral edge extending the length of the elongate flexible tubular body, the first lateral edge comprising a first strip of fastener material extending along the first lateral edge and the second lateral edge comprising a second strip of fastener material extending along the second lateral edge, and
         a wire pulling jacket eyelet positioned at the first end of the elongate flexible tubular body, wherein the eyelet of each of the plurality of wire pulling grips is positioned adjacent the wire pulling jacket eyelet.

2. The system of claim 1, wherein the first strip of fastener material and the second strip of fastener material comprise a hook and loop fastener.

3. The system of claim 1, wherein the elongate flexible tubular body is made from woven nylon.

4. The system of claim 1, wherein the elongate flexible tubular body is made from a woven material.

5. The system of claim 1, wherein the plurality of wire pulling grips is disposed lengthwise inside of the wire pulling jacket.

6. The system of claim 1, wherein the eyelet of each of the plurality of wire pulling grips and the wire pulling jacket eyelet are secured to a wire pulling rope.

7. A system for installing wires into a conduit, the system comprising:
   a plurality of wire pulling grips, each of the plurality of wire pulling grips comprising:
      an eyelet located at a first end of the wire pulling grip,
      a clamp body located at a second end of the wire pulling grip, the clamp body comprising a textured cam extending inwardly into a bore of the clamp body, the textured cam being biased towards a center of the clamp body, and
      an elongate gripping body located between the eyelet and the clamp body, the elongate gripping body for securing and applying a majority of a pulling force to a wire associated with one of the wire pulling grips; and
   an elongate flexible jacket configured for enclosing the plurality of wire pulling grips, the elongate flexible jacket comprising
      a tubular body comprising:
         a first end having a first opening,
         a second end having a second opening, and
         a single lengthwise opening extending a length of the tubular body, the single lengthwise opening selectively openable along the length thereof for placement around the plurality of wire pulling grips, and
      an elongate flexible jacket eyelet formed adjacent the first opening of the first end, wherein the eyelet of each of the plurality of wire pulling grips is positioned adjacent the elongate flexible jacket eyelet.

8. The system of claim 7, wherein the plurality of wire pulling grips is located inside the tubular body of the elongate flexible jacket.

9. The system of claim 8, wherein the plurality of wire pulling grips is enclosed within the elongate flexible jacket.

10. The system of claim 7, wherein the plurality of wire pulling grips has the wires extending therefrom, and wherein the wires extend out of the second end of the elongate flexible jacket.

11. The system of claim 7, wherein the tubular body further comprises a fastener for selectively closing the single lengthwise opening.

12. The system of claim 7, wherein the tubular body is formed from a flexible woven material.

13. A method for pulling wires through a conduit comprising:
   selecting a plurality of wire pulling grips, each of the plurality of wire pulling grips being elongate and having a first end with a pulling eyelet and a second end having a clamp body comprising a textured cam extending inwardly into a bore of the clamp body, the textured cam being biased towards a center of the clamp body, the textured cam for receiving and gripping one of the wires;
   attaching the clamp body of each of the plurality of wire pulling grips to one of the wires;
   attaching the plurality of wire pulling grips to a wire pulling line;
   opening a single lengthwise opening of an elongate flexible pulling jacket, the elongate flexible pulling jacket comprising a wire pulling jacket eyelet;
   inserting the plurality of wire pulling grips into the elongate flexible pulling jacket via the single lengthwise opening;
   positioning the pulling eyelet of each of the plurality of wire pulling grips adjacent the wire pulling jacket eyelet;
   enclosing the plurality of wire pulling grips within the elongate flexible pulling jacket; and pulling the wires, the plurality of wire pulling grips, and the elongate flexible pulling jacket through the conduit via the wire pulling line.

14. The method of claim 13, wherein the elongate flexible jacket comprises an elongate tubular body, a first end having a first opening and having the wire pulling jacket eyelet formed adjacent the first opening, and a second end having a second opening.

15. The method of claim 13, wherein enclosing the plurality of wire pulling grips within the elongate flexible pulling jacket comprises utilizing a fastener to close the single lengthwise opening.

16. The method of claim 13, further comprising attaching the wire pulling jacket eyelet to the wire pulling line together with the pulling eyelet of each of the plurality of wire pulling grips.

17. The system of claim 1, wherein each of the plurality of wire pulling grips further comprises:
- a length of wire cable;
- a cable sleeve; and
- a clamping body.

18. The system of claim 1, wherein the textured cam comprises teeth that extend inwardly into the bore of the clamp body.

19. The system of claim 1, wherein each of the plurality of wire pulling grips has a different overall length so that the clamp body of each of the plurality of wire pulling grips is located at a different length from a clevis connecting the eyelet of each of the plurality of wire pulling grips together.

\* \* \* \* \*